United States Patent
Fischer (12)

(10) Patent No.: US 6,347,387 B1
(45) Date of Patent: Feb. 12, 2002

(54) TEST CIRCUITS FOR TESTING INTER-DEVICE FPGA LINKS INCLUDING A SHIFT REGISTER CONFIGURED FROM FPGA ELEMENTS TO FORM A SHIFT BLOCK THROUGH SAID INTER-DEVICE FPGA LINKS

(75) Inventor: Frederick H. Fischer, Lehigh, PA (US)

(73) Assignee: Agere Systems Guardian Corp., Orlando, FL (US)

(\*) Notice: Subject to any disclaimer, the term of this patent is extended or adjusted under 35 U.S.C. 154(b) by 0 days.

(21) Appl. No.: 09/169,848

(22) Filed: Oct. 9, 1998

(51) Int. Cl.[7] .............................................. G01R 31/28
(52) U.S. Cl. ...................... 714/738; 714/735
(58) Field of Search .................. 714/727, 42, 738, 714/726, 725, 731, 38, 735, 739, 741; 326/38; 324/158.1

(56) References Cited

U.S. PATENT DOCUMENTS

| | | | | |
|---|---|---|---|---|
| 5,202,625 A | * | 4/1993 | Farwell ..................... 714/727 |
| 5,291,079 A | * | 3/1994 | Goetting ...................... 326/38 |
| 5,355,369 A | | 10/1994 | Greenberger et al. ....... 714/727 |
| 5,570,372 A | | 10/1996 | Shaffer ....................... 370/108 |
| 5,623,483 A | | 4/1997 | Agrawal et al. ............ 370/253 |
| 5,651,013 A | * | 7/1997 | Iadanza ...................... 714/731 |
| 5,654,967 A | | 8/1997 | Okuyama et al. ........... 370/375 |
| 5,672,966 A | * | 9/1997 | Palczewski et al. ...... 324/158.1 |
| 5,720,031 A | * | 2/1998 | Lindsay ....................... 714/42 |
| 5,764,657 A | * | 6/1998 | Jones ......................... 714/738 |
| 5,852,617 A | * | 12/1998 | Mote, Jr. .................... 714/726 |
| 5,867,507 A | * | 2/1999 | Beebe et al. ................ 714/726 |
| 6,003,150 A | * | 12/1999 | Stroud et al. ............... 714/725 |

\* cited by examiner

*Primary Examiner*—David Ton
(74) *Attorney, Agent, or Firm*—Synnestvedt & Lechner LLP

(57) ABSTRACT

A test device for testing inter-device connections of field programmable gate arrays (FPGAS) by using the FPGAs themselves during testing to form a shift register. Particularly, the shift register comprises flip-flops and buffers interconnected by the actual FPGA inter-device or inter-device connections under test. A control circuit generates an input test pattern which is serially input into one end of the shift register and read out of the other end. The input pattern and the output pattern are compared to determine if they match. If they match, there are no faults through the interconnections used in the shift register. The shift register also may be bidirectional such that the input and output patterns are read in and out at the same terminal.

29 Claims, 5 Drawing Sheets

TEST CIRCUITS FOR TESTING INTER-DEVICE FPGA LINKS INCLUDING A SHIFT REGISTER CONFIGURED FROM FPGA ELEMENTS TO FORM A SHIFT BLOCK THROUGH SAID INTER-DEVICE FPGA LINKS

FIELD OF THE INVENTION

This invention generally relates to the testing of Field Programmable Gate Array (FPGA) systems. In particular, the invention relates to testing of inter-device connections among multiple FPGAs on products and development boards that use multiple FPGAs.

BACKGROUND OF INVENTION

The use of FPGAs in various development boards including prototype boards and tester boards is very common. Due to their programmable features, FPGAs offer inexpensive and fast means for testing various integrated circuit designs before building a maskwork for a final product. A typical development board comprises multiple FPGAs interconnected to each other.

The prior art offers limited capabilities for testing development boards comprising multiple FPGAs. One commonly known testing method is termed a "bed of nails" test. Under this test, a development board to be tested is placed on an Automated Testing Equipment (ATE) device such that a plurality of conducting pins of the ATE, i.e., the "bed of nails", are brought into contact with selected portions or selected terminals of the various devices mounted on the development board.

The ATE applies electrical signals to various selected terminals on the development board, and waits for response signals at the same and/or other terminals. The response signals from these selected terminals are analyzed within the ATE and/or forwarded from the bed of nails terminals to further equipment for analysis. In this manner, the response signals received in response to the input electrical signals applied by the ATE can be compared to the expected output signals. If the development board fails to respond in the expected manner, a defect is indicated.

The bed of nails test is expensive and only verifies the schematic layout of a development board. Under this test, the development board is tested on the initial build, prior to any FPGA components being mounted or soldered. The test does not provide for any testing after FPGAs and other Integrated Circuit (IC) components are mounted or soldered on the board.

One prior art method for testing IC's after they have been mounted on a development board is JTAG scan. A JTAG scan chain test may be utilized to test a development board on which FPGAs are already mounted. This test checks the I/O (Input/Output) toggle on FPGAs and on other IC components. However, JTAG does not exist on many FPGA devices. Furthermore, for the few that employ actual JTAG, there is an area and cost penalty.

Thus, there exists a need for a flexible testing circuit or testing device which may test not only the board traces but also the associated solder bump bonds, i.e., inter-device connections among multiple FPGAs, while not incurring the area/cost penalties associated with dedicated JTAG circuitry.

SUMMARY OF THE INVENTION

The present invention provides a testing device to test inter-device FPGA links among multiple FPGAS. Unlike a dedicated conventional JTAG circuit which tests all the I/O pins, the inventive testing device can be programmed to test a subset of I/O pins required for a specific application. After completing a test for a specific application, the testing device may be configured and reused for another application.

In the preferred embodiment, a testing device comprises a control circuit coupled to a unidirectional shift register. The control circuit comprises a clock generator, a pattern generator, a descrambler, a comparator, and a recorder.

The shift register comprises a plurality of flip-flops and buffers which form a shift block through various inter-device FPGA links to be tested. This shift register is customarily designed for each different type of test by instructional means or other programmable means. This shift register may be configured from the existing elements of FPGAs.

The shift register accepts a pattern signal from the control circuit as an input signal and communicates it over the FPGA inter-device links to be tested. It then generates an output signal back to the control circuit. The control circuit compares the input and output signal to determine whether FPGA links are working according to specification.

In an alternative embodiment, a testing device comprises a control circuit and a bi-directional shift register. In this shift register, pattern signals travel on a route in one direction, and then reverse the direction to travel backwards on the same route. This testing device not only checks whether FPGA links are working properly but also provides feedback on the source of the problem.

In another alternative embodiment, a testing device comprises a plurality of input buffers to receive input control signal, a plurality of flip-flops to communicate these input signals over a plurality of inter-device FPGA links, and a plurality of output buffers to output the control signals. The output control signals are compared to the expected output. If the signal patterns match, the results are pass indicating the operational integrity of inter-device FPGA the links mismatch indicates a fault.

Even though this testing device tests multiple inter-device FPGA links, the output from each FPGA link is received on a particular output buffer. Therefore, the output signal is monitored in real-time, and the problems are also detected in real-time. Also, the fault indication immediately points to the source of the problem.

In the preferred embodiment, the shift register components (e.g. flip-flops and buffers) are formed by the existing components of the FPGA.

The inventive device provides a user with the ability to choose the number of FPGA links to be tested. The testing device also provides a user flexibility to choose the pattern of the input signal to be transmitted through the shift register.

BRIEF DESCRIPTION OF THE DRAWINGS

The features of the invention believed to be novel are specifically set forth in the appended claims. However, the invention itself, both as to its structure and method of operation, may be best understood by referring to the following description and accompanying drawings.

DETAILED DESCRIPTION OF A PREFERRED EMBODIMENT

The present invention provides a method and apparatus for testing inter-device FPGA links. The prior art provides means for testing FPGA components via JTAG circuitry dedicated for that purpose. The present invention utilizes a shift register, configured from the existing programmable logic on FPGA devices, to push-in an input data pattern and to receive an output pattern in a new and useful manner to test inter-device FPGA links. The circuit of the present invention also compares the input pattern to the output pattern and produces a pass/fail output and optionally count data concerning a location of potential failure. When finished, the test circuitry can be reconfigured to perform other logic functions.

Description will now be given in detail of a few preferred embodiments of the invention, examples of which are illustrated in the accompanying drawings. It should be understood that the following description is not intended to limit the invention to those embodiments.

Figure 1:
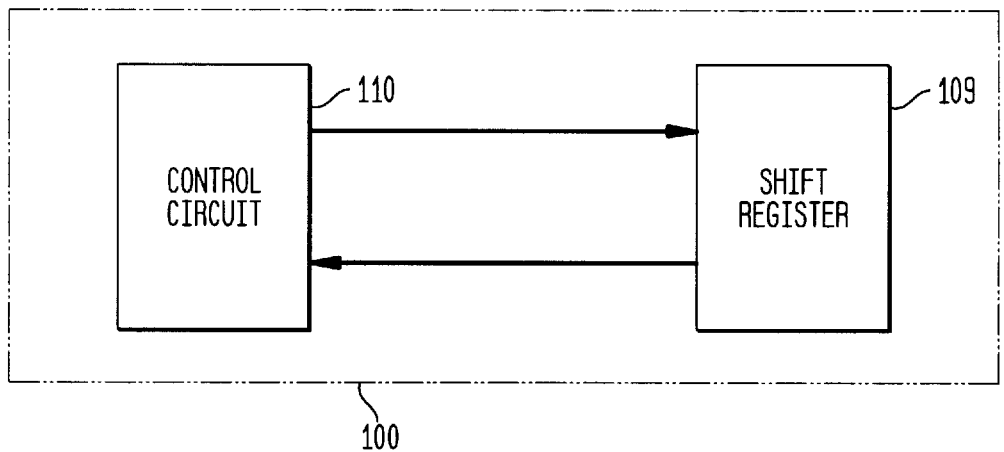
FIG. 1 is a block diagram illustrating a preferred embodiment of a testing device 100 in accordance with the principles of the present invention.

FIG. 1 is a block diagram of a first preferred embodiment of the testing device 100 according to the principles of the present invention. The testing device 100 comprises a control circuit 110 coupled to a shift register 109.

Figure 2:
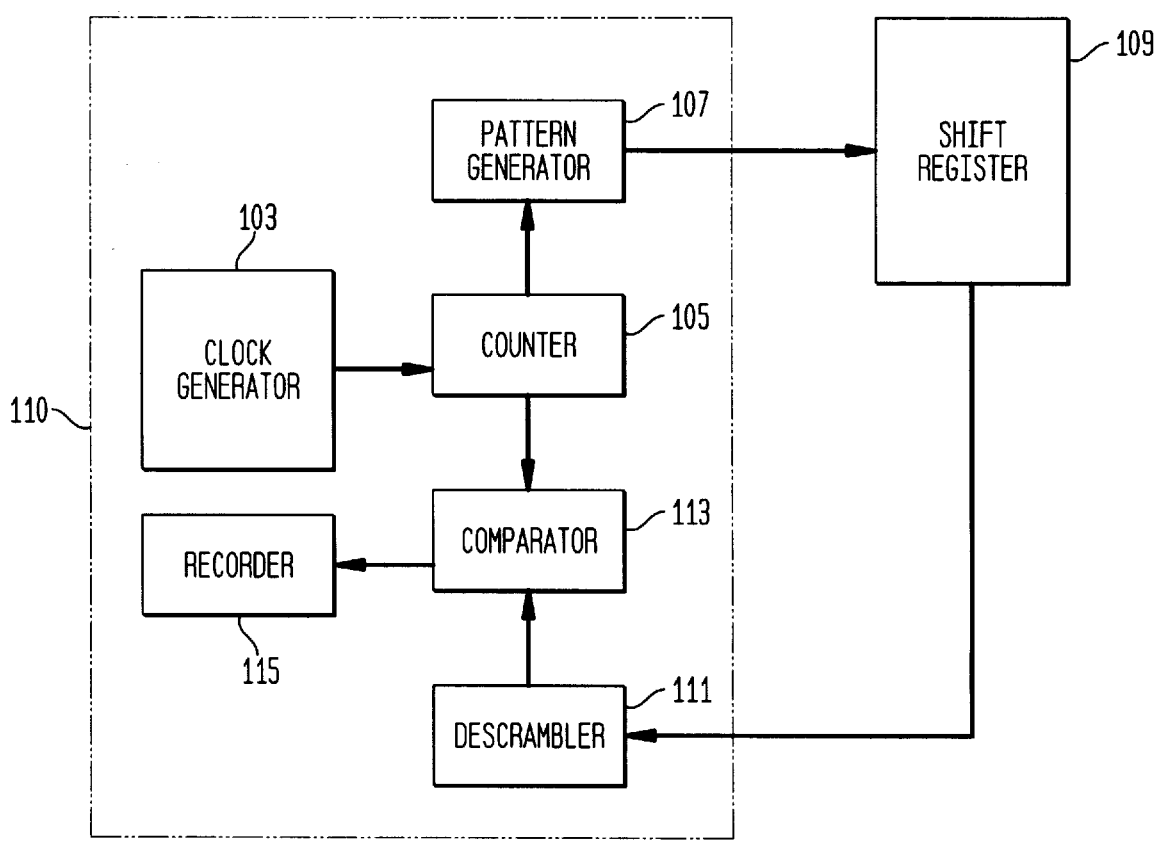
FIG. 2 is a block diagram illustrating a control circuit 110 used in the testing device 100 of FIG. 1.

FIG. 2 is a block diagram illustrating the control circuit 110 used in the testing device 100 of FIG. 1. The control circuit 110 comprises a clock generator 103, a counter 105, a pattern generator 107, a descrambler 111, a comparator 113 and a recorder 115. The recorder 115 is a memory device used for storing information.

In control circuit 110, the clock generator 103 is connected to the counter 105 via a unidirectional link. The counter 105 is also directly connected to the pattern generator 107 and the comparator 113. The pattern generator 107 also has a direct link to the shift register 109.

The shift register 109 is coupled to the descrambler 111 such that the shift register 109 may directly transmit a signal to the descrambler 111. The descrambler 111 is also directly connected to the comparator 113. Directly connected to the comparator 113 is the recorder 115.

In operation, the clock generator 103 receives a clock input signal from an external circuit (not shown). The clock generator 103 then generates a clock pulse which is transmitted to the counter 105. In response to each clock pulse, the counter 105 increments its count and outputs it to the pattern generator 107. The pattern generator 107, which can be a traditional linear feedback shift register (LFSR), receives the counter output signal and generates a different pseudo-random LFSR bit pattern for each potential counter output value. Its output is coupled to an input of the shift register 109. This pseudo-random LFSR bit pattern is called an input pattern signal.

Figure 3:
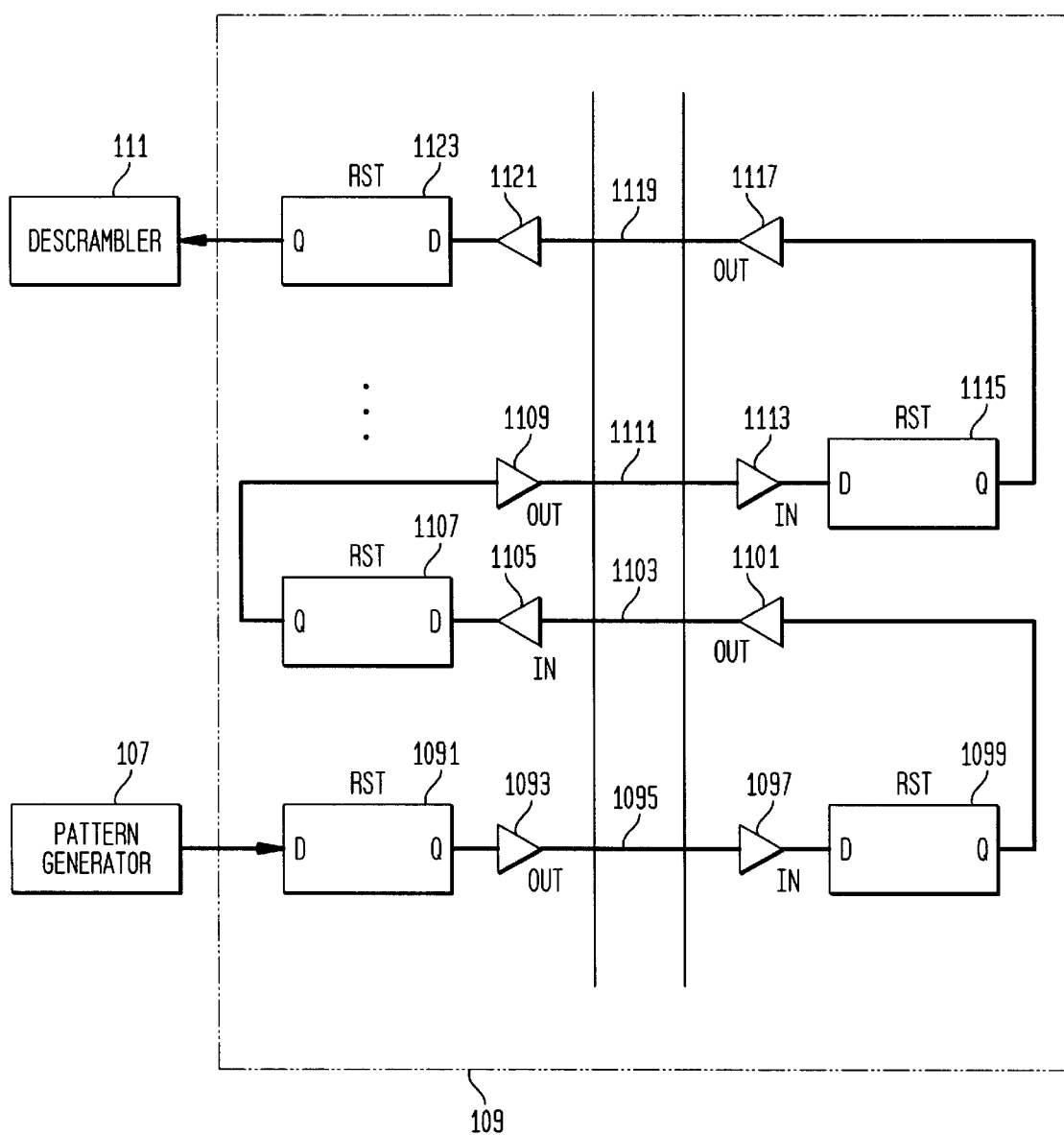
FIG. 3 is a block diagram illustrating a shift register 109 used in the testing device 100 of FIG. 1.

The shift register 109 can comprise a series of flip-flops and buffers which form a large shift register through inter-device connections among multiple FPGAs. FIG. 3 is a detailed drawing of an embodiment of the shift register 109. The shift register 109 receives the input pattern signal from the pattern generator 107, communicates it through its various components, and generates an output pattern signal which is transmitted back to the descrambler 111 of control circuit 110.

Referring back to FIG. 2, the descrambler 111 receives the output pattern signal, decodes it to a value corresponding to the counter output values, and sends the decoded output signal to the comparator 113. The descrambler for instance may employ a look up table that cross references patterns signals to a count value. Alternately, the pattern signals may be convertible to and from count values by means of an algorithm which is performed by the descrambler.

The comparator 113 receives the decoded output signal from descrambler 111, receives the input pattern signal from counter 105, and then compares the two signals. If the signals match, the result is declared a "pass", and the recorder 115 records the result as a pass. If the signals do not match, the test is declared a "fail" and the recorder 115 records the result as a fail.

The above process is then repeated as the clock generator 103 generates the next clock pulse. Recorder 115 records the result as a fail. In a preferred embodiment, the above process is repeated for multiple iterations by transmitting various input pattern signals through the shift register 109. The inventive device provides a user a capability to choose the number of iterations by which inter-device FPGA links may be tested. In each iteration, a different input pattern signal is transmitted over a FPGA inter-device link to be tested, and the output pattern signal is compared to the expected output.

FIG. 3 is a block diagram illustrating the various components of an exemplary shift register 109 as shown in testing device 100 in which four inter-device FPGA links 1095, 1103, 1111 and 1119 are tested.

The shift register 109 is customarily designed for each application. The shift register 109 can be designed using the existing components of a FPGA.

The shift register 109 comprises a series of flip-flops 1091, 1099, 1107, 1115, 1123, input/output buffers 1093, 1097, 1101, 1105, 1109, 1113, 1117, 1121, and FPGA inter-device links 1095, 1103, 1111, 1119. The flip-flops, input/output buffers and FPGA inter-device links in sum comprise a large shift register 109. The purpose of shift register 109 is to accept the pseudo-random LFSR bit pattern from control circuit 110 as an input pattern signal and shift it through the register using the inter-device FPGA links that are being tested as the pathways of the shift register. If the inter-device links are working properly, the pattern output at the other end of the shift register should match the input pattern.

In shift register 109, the output terminal of flip-flop 1091 is serially connected to the output buffer 1093. The output buffer is also connected to the input buffer 1097 by the inter-device FPGA link 1095. The input buffer 1097 is serially connected to the input terminal flip-flop 1099, and the flip-flop 1099 is serially connected to an output buffer 1101. The output buffer 1101 is also connected to an input buffer 1105 by inter-device FPGA link 1103. The FPGA links 1093, 1003 are inter-device links among FPGAs. These links are being tested by the inventive device by configuring a shift register 109 which incorporates these links in its configuration. The shift register 109 may be configured by using existing components of a FPGA and simply programming the FPGA to act as a shift register.

Directly connected to the input buffer 1105 is the input terminal flip-flop 1107. The output terminal of the flip-flop 1107 is serially connected to the output buffer 1109. The output buffer 1109 is connected to the input buffer 1113 by an inter-device FPGA link 1111. The input buffer 1113 is directly connected to the input terminal flip-flop 1115, and the output terminal of flip-flop 1115 is directly connected to an output buffer 1117. The output buffer 1117 is connected to an input buffer 1121 by the inter-device FPGA link 1119. Directly connected to the input buffer 1121 is the input terminal of flip-flop 1123. The output terminal of the flip-flop 1123 is connected to descrambler 111 of the control circuit 110.

The shift register 109 is a unidirectional shift register such that the data is accepted by the first flip-flop 1091 and is transmitted serially to various devices in shift register 109 before it is output to the descrambler 111 by the last flip-flop 1123.

The pattern generator 107 generates a pseudo-random LFSR bit pattern which is serially transmitted to the first flip-flop 1091 as an input pattern signal. A typical flip-flop 1091 has at least three terminal—an input terminal, an output terminal, and a reset terminal. The input terminal accepts each bit of the LFSR bit pattern sequentially, the output terminal outputs the LFSR bit pattern, and the reset terminal is used to reset the process.

Preferably, a clock signal (not shown) controls the shift register 109 to continuously shift in the next bit of the input pattern signal. The first flip-flop 1091 sequentially receives the each bit of the input pattern signal and transmits it sequentially to the output buffer 1093. The output buffer 1093 receives each input pattern signal and transmits it to input buffer 1097. While communicating from the output buffer 1093 to the input buffer 1097, the input pattern signal bit travels over the inter-device FPGA link 1095.

The input buffer 1097 transmits each input pattern signal bit to the second flip-flop 1099. The second flip-flop 1099 transmits each input pattern signal bit to the output buffer 1101. The output buffer then transmits each input pattern signal bit to the input buffer 1105. While communicating from the output buffer 1101 to the input buffer 1105, the input pattern signal bit travels over the second inter-device FPGA link 1103.

After that, the LFSR bit pattern travels to the input buffer 1113, to the flip-flop 1115, to the output buffer 1117, to the inter-device FPGA link 1119, to the input buffer 1121, and to the flip-flop 1123. The flip-flop 1123 then serially outputs an output pattern signal to the control circuit 110. In the control circuit 110, the comparator 113 compares the output pattern signal from shift register 109 to the input pattern signal. If the signals match, the result is declared a pass, if the signals do not match, the test is declared a fail.

A "pass" result indicates that all the inter-device links are working. A "fail" result indicates a fault in one of the inter-device links.

The number of flip-flops required in the shift register 109 depends upon the number of inter-device links requiring testing. In FIG. 2, there are four different links 1095, 1103, 1111, and 1119 which need to be tested. consequently, five different flip-flops 1091, 1099, 1107, 1115, 1123 are shown. However, a user has flexibility to choose the number of inter-device links to be tested.

Thus, the testing device 100, can be effectively used to determine whether inter-device FPGA links are working according to the specification. The testing device 100 may be modified to add an optimal module, such as external circuitry or probes, to observe the failing output pattern and to locate the position of the faults.

Figure 4:
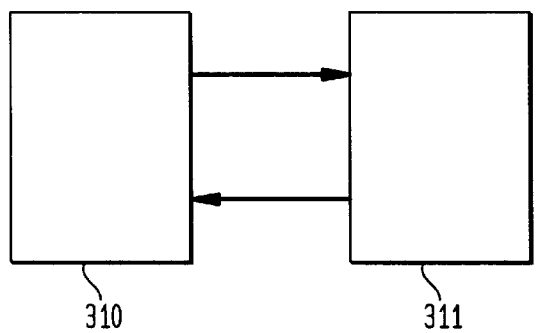
FIG. 4 is a block diagram illustrating an alternative embodiment of a testing device 300 in accordance with the principles of the present invention.

FIG. 4 is a block diagram illustrating an alternative embodiment of a testing device 300 according to the principles of the present invention.

The testing device 300 is similar to the testing device 100 previously described, but the shift register 311 of testing device 300 utilizes bi-directional buffers. Therefore, in testing device 300 the pattern signals travel on a route in one direction, and then reverse the direction to travel backwards on the same route. In testing device 300, the bi-directional buffers are utilized both as input buffers and as output buffers. On the other hand, the testing device 100 utilizes unidirectional buffers, wherein pattern signals travels only in one direction.

In this embodiment, the testing device 300 comprises a control circuit 310 coupled to a shift register 311.

Figure 5:
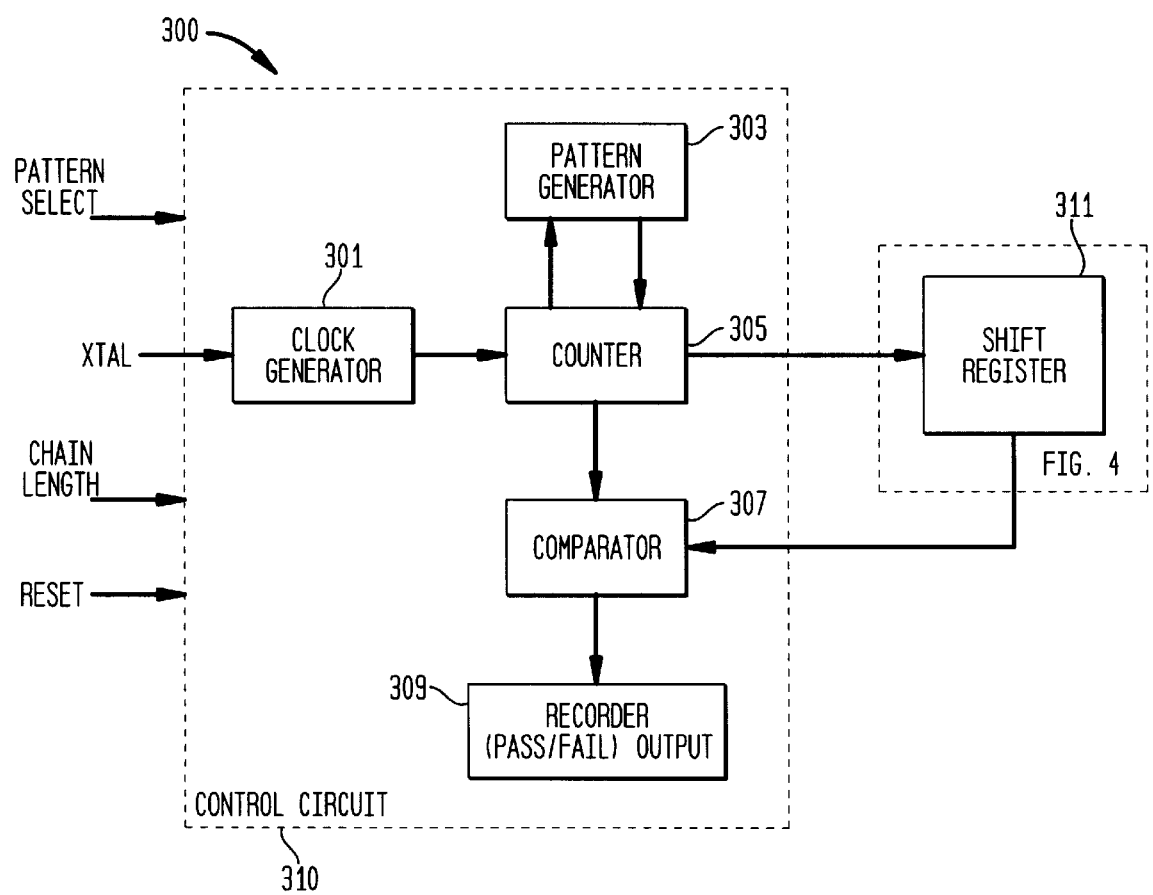
FIG. 5 is a block diagram illustrating a control circuit 310 used in the testing device 300 of FIG. 4.

FIG. 5 illustrates the control circuit 310 as used in testing device 300 of FIG. 4. The control circuit 310 comprises a clock generator 301, a pattern generator 303, a counter 305, a comparator 307 and a recorder 309. The clock generator 301 is connected to the counter 305 via a unidirectional link. The counter 305 is further connected to the pattern generator 303 via a bi-directional link. The counter 305 is also connected to the comparator 307. The comparator 307 is directly connected to the recorder 309.

Connected to the control circuit 310 is a shift register 311. The shift register 311 has a direct connection to the counter 305 such that counter 305 may directly transmit data to shift register 311. The shift register 311 also has a direct connection to the comparator 307 such that the shift register 311 may transmit pattern signals to the comparator 307.

The functionality of control circuit 310 is similar to control circuit 110 of the testing device 100.

In control circuit 310, the clock generator 301 receives an input from an external clock source, e.g., a crystal. The clock generator 301 generates a clock pulse which is transmitted to the counter 305. In response to each clock pulse, the counter 305 increments its count to the pattern generator 303. The pattern generator 303, which can be a traditional linear feedback shift register (LFSR), receives the counter output signal and generates a different pseudo-random LFSR bit pattern for each potential counter output value which is provided to the counter 305. This pseudo-random LFSR bit pattern is called an input pattern signal.

The counter 305 receives the input pattern signal, increments its counter and transmits the input pattern signal to the shift register 311. The shift register 311 receives the input pattern signal, communicates it over its various components and generates an output which is transmitted back to the comparator 307.

The comparator 307 then compares the output pattern signal to the input pattern signal. If both pattern signals match, the result is a pass; if there is a mismatch, the result is a fail.

A "pass" result indicates that all the inter-device links are working. A "fail" result indicates a fault in at least one of the inter-device links. Both pass and fail outputs are recorded in the recorder 309.

Figure 6:
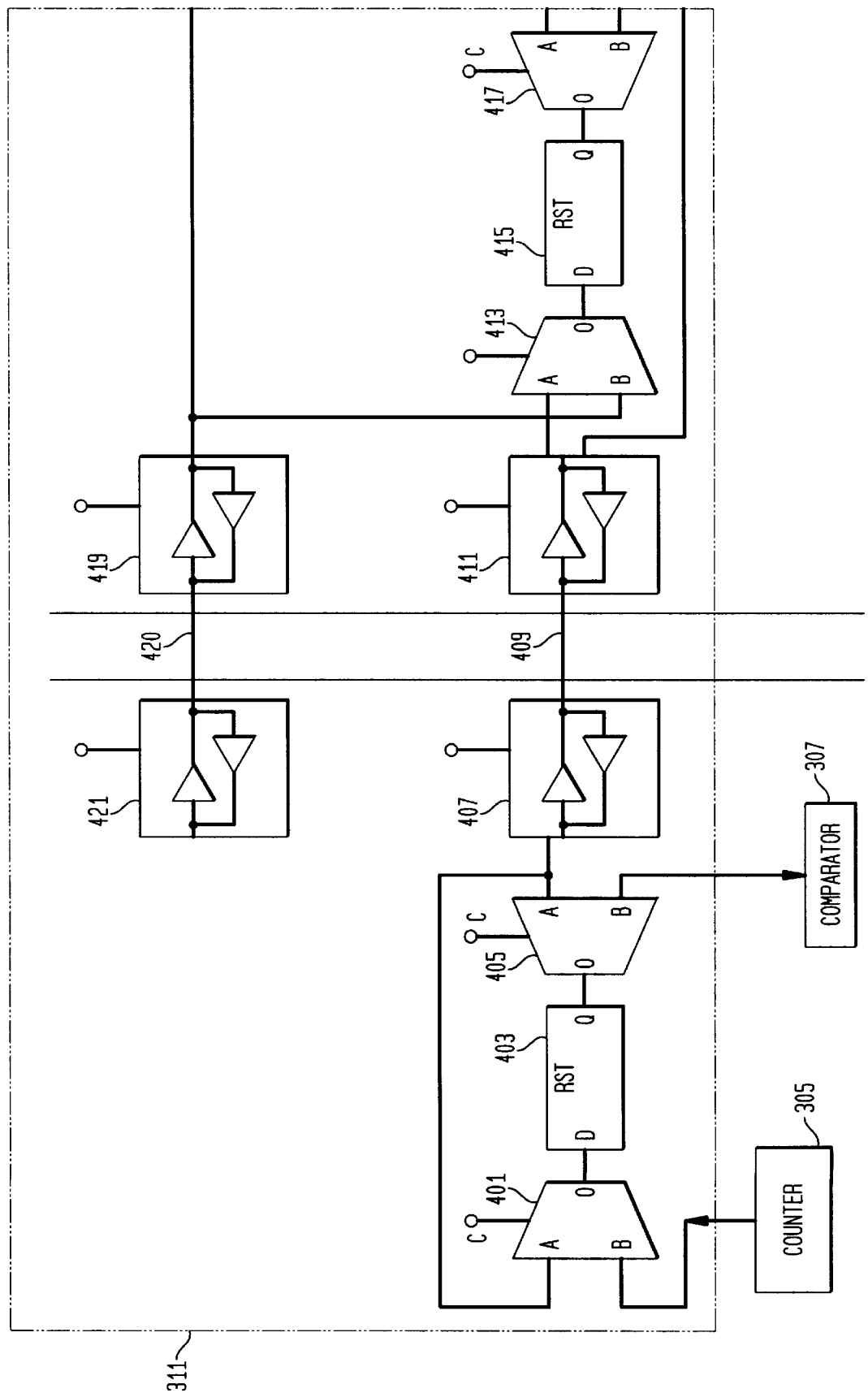
FIG. 6 is a block diagram illustrating a shift register 311 used in the testing device 300 of FIG. 3.

FIG. 6 is a block diagram illustrating a preferred embodiment of the shift register 311 shown in FIG. 3. The shift register 311 is similar to shift register 109 previously described, except that shift register 309 utilizes bi-directional buffers. Therefore, the pattern signals travel on a route in one direction, and then reverse the direction to travel backwards on the same route.

The shift register 311 comprises a series of multiplexers 401, 405, 413, 417, flip-flops 403, 415, bi-directional buffers 407, 411, 419, 421, and inter-device FPGA links 409, 420. The multiplexer, flip-flops, bi-directional buffers together form a large bi-directional register through the connections among the multiple FPGAs. The inventive device tests the inter-device FPGA links by configuring a shift register around these links and shifting in a data pattern over these links. The shift register may be configured by utilizing the existing components of a FPGA.

In shift register 311, the bidirectional buffers 407, 411, 419, 421 each have a control terminal. The control terminals of the buffers determine the direction of the data and allow each buffer to be used as an input buffer and an output buffer.

In shift register 311, a multiplexer 401 is serially connected to a flip-flop 403. The multiplexer 401 also has a direct link to the counter 305 such that the multiplexer 401 receives the data pattern transmitted by counter 305. The input terminal of flip-flop 403 is connected to a multiplexer 405. The output of multiplexer 405 is connected to the input of a bi-directional buffer 407. The multiplexer 401 and the multiplexer 405 are also inter-connected. The multiplexer 405 also has a direct connection to the comparator 307 such that the multiplexer 405 transmits the data which is received by the comparator 307.

The bi-directional buffer 407 is connected to another bi-directional buffer 411 over an inter-device FPGA link 409. The bi-directional buffer 411 is connected to a multiplexer 413, and the multiplexer 413 is connected to a flip-flop 415. The flip-flop 415 is connected to a multiplexer 417. The multiplexer 413 and 417 are also inter-connected. The multiplexer 417 has a direct link to another bi-directional buffer 419. The bi-directional buffer 419 is also connected to the multiplexer 413.

The bi-directional buffer 419 is also connected to another bi-directional buffer 421 by another inter-device FPGA link 420.

The multiplexers 401, 405, 413, 417 each have two input terminals, one output terminal, and a control terminal. The control terminals of multiplexers 401, 413, 417 determine the direction of the data. The multiplexer 401 and the multiplexer 405 are traditional multiplexers with bi-directional control capabilities. This bi-directional control allows each multiplexer to selectively receive or transmit a pattern signal thus allowing the pattern signal to selectively travel in both directions through the shift register 311. When the control for a buffer is low, the buffer is an input buffer, and when the control for a buffer is high, the buffer is an output buffer.

In operation, the device alternately operates in one of two control states. In the first control state, the control inputs of the multiplexers and bidirectional buffers are set in a certain configuration as described below. The multiplexer 401 of the shift register 311 receives the input pattern signal from the counter 305 in control circuit 310. The control for multiplexer 401 is low and the multiplexer 401 accepts the input pattern signal and forwards it to the flip flop 403. The flip-flop 403 further transmits the input pattern signal to the multiplexer 405. The control for multiplexer 405 is also low, and the multiplexer 405 transmits the input pattern signal directly to the bi-directional buffer 407. The control for bi-directional buffer 407 is high in the first state, so the buffer 407 acts as an output buffer. The bi-directional buffer 407 accepts the input pattern signal and transmits it to multiplexer 411 over the first FPGA link 409. The control for bi-directional buffer 411 is low in this first state such that the bi-directional buffer 411 is an input buffer.

The bi-directional buffer 411 accepts the input pattern signal and then transmits it to the multiplexer 413. The control for multiplexer 413 is low in first state such that the multiplexer 413 accepts the LFSR bit pattern and transmits it to flip-flop 415. The flip-flop 415 transmits the input pattern signal to the multiplexer 417. The control for multiplexer 417 is low in the first state such that the multiplexer 417 forwards the input pattern signal to the bi-directional buffer 419.

The control for bi-directional buffer 419 is high in the first state such that the bi-directional buffer 419 acts as an output buffer. The bi-directional buffer 419 accepts the LFSR bit pattern and transmits it to the bi-directional buffer 421 over the second FPGA link 420. The control for bi-directional buffer 421 is low in the first state so that the bi-directional buffer 421 acts as input buffer.

The shift register 309 then switches to the second control state to reverse the travel direction of the LFSR bit pattern. This is accomplished by reversing the controls on the bi-directional buffers 421, 419, 411, 407 as well as on multiplexers 417, 413, 405, 401. The control of the bi-directional buffer 421 is now high. Thus, the bi-directional buffer 421 is now an output buffer, and the input pattern signal travels from the bi-directional buffer 421 to the inter-device FPGA link 420, and then to the bi-directional buffer 419. The control of bi-directional buffer 419 is low in the second control state such that the bi-directional buffer 419 is now an input buffer. The bi-directional buffer 419 transmits the input pattern signal to the multiplexer 413.

The control of the multiplexer 413 is now high, so the input pattern signal is transmitted to the flip-flop 415, and then to the multiplexer 417. The control of multiplexer 417 is now high and the pattern signal is directly transmitted from the multiplexer 417 to the bi-directional buffer 411. The control of the bi-directional buffer 411 is now high and the bi-directional buffer 411 is now an output buffer.

The input pattern signal is then transmitted from the bi-directional buffer 411 over the FPGA link 409 to the bi-directional buffer 407.

The control of the bi-directional buffer 407 is now low, therefore the bi-directional buffer 407 is now an input buffer. The bi-directional buffer 407 accepts the input pattern signal and directly forwards it to multiplexer 401.

The control for multiplexer 401 is now low and the multiplexer 401 forwards the input pattern signal to flip-flop 403. The flip-flop 403 then transmits the input pattern signal to multiplexer 405. The control for multiplexer 405 is now high and the multiplexer 405 outputs an output pattern signal to the comparator 307 located in control circuit 310.

As can be seen from the description above, in this embodiment, the shift register 311 is a bi-directional shift register. It receives the input pattern signal, and communicates it over a series of devices and then reverses the direction of the input pattern signal and communicates it over the same devices, but, in a reverse direction. It then outputs an output pattern signal to the control circuit 310.

The comparator 307 then compares the output pattern signal to the input pattern signal. Each bit of the input pattern signal is compared to the each bit of the output pattern signal. The match between the reference pattern and the LFSR output indicates that all the inter-device links are working. A mismatch indicates a fault in one of the inter-device FPGA links. If one of the inter-device FPGA links are not working according to the specification. The output pattern signal will show a fault condition in its output LFSR value. For example, if an input pattern is 00101001, and the output pattern is 00100000, it immediately indicates that one of the inter-device links is fused out or otherwise malfunctioning.

If a fault is found, the testing device 300 also has the capability to determine from the output pattern signal the location of the first fault. This may be accomplished by having an external output circuit or a probe coupled to the output of the testing device 300.

As the same route is used to push in and push out the input pattern signal, the resulting LFSR output pattern not only indicates that a fault exists, but also the location of the first fault. Specifically, to locate the position of the fault, starts comparing each bit of the input pattern signal is compared to each bit of the output pattern signal in a sequential order. The first mismatched bit indicates the source of the fault as the source of the mismatch bit. In our example, where the input pattern is 00101001 and output pattern is 00100000, the first mismatch is the $5^{th}$ bit and the fault can be pointed to the source of $5^{th}$ bit.

In this embodiment, the fault-detection and resolution is a sequential process. If there is more than one fault, the first fault is fixed, the input pattern signal is again pushed to the shift register 311, another output pattern signal is received, and then the two are compared. If a mismatch is received again, then there must be a second fault and the location of the second fault is latched, and fixed. The above iteration is repeated until all the faults are found and fixed. The fault-detection and resolution may be accomplished by computer or other software means.

Therefore, the testing device 300 can be effectively used to determine whether inter-device FPGA links are working according to the specification. The main intent of the present invention is to use the programmability of the FPGAs to check for faults and simple adjacent pin shorts on a fully assembled prototype or tester board prior to implementing another desired circuit function.

Testing device 300 of FIGS. 4–6 has a shift register for testing only two inter-device FPGA links in order to illustrate the invention by means of a very simple example. However, the present invention may be used to test any number of inter-device connections among multiple FPGAs.

Figure 7:
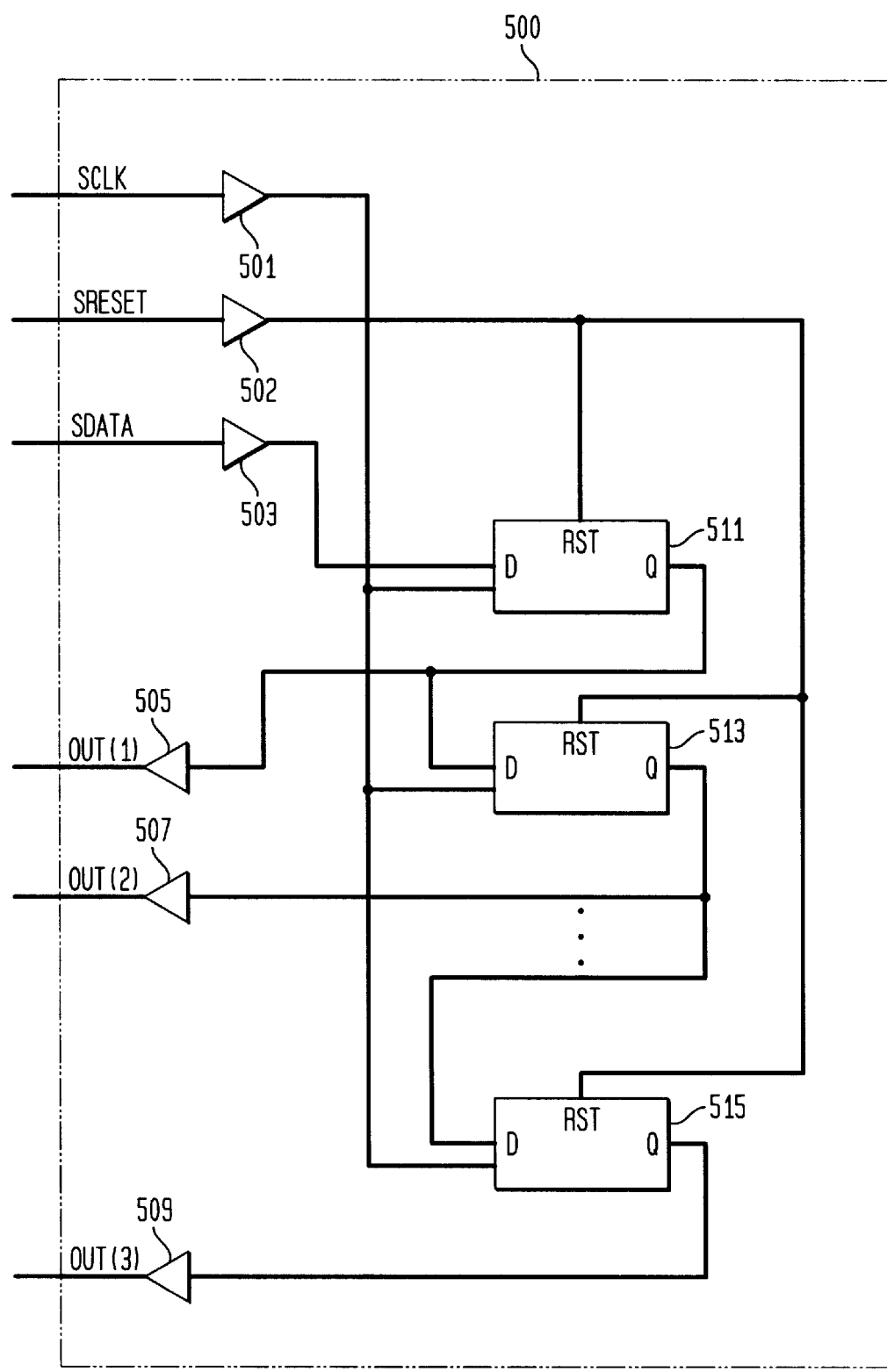
FIG. 7 is a block diagram illustrating another alternative embodiment of a testing device 500 in accordance with the principles of the present invention.

FIG. 7 is a block diagram illustrating another alternative embodiment of a testing device 500 in accordance with the principles of the present invention. This embodiment is particularly applicable for testing a single inter-device FPGA link.

The testing device 500 has three input control signals termed clock (SCLK), reset (SRESET), data (SDATA) and three output terminals termed OUT(1), OUT(2), OUT(3). The testing device 500 also comprises three input buffers 501, 502, 503 to handle input control signals, and three output buffers 505, 507, 509 for the output signals. The number of output buffers is equal to the number of output pins located on a FPGA. The input buffer 501 is connected to the SCLK control signal. The input buffer 502 is coupled to receive the SRESET control signal and input buffer 503 is coupled to receive the SDATA control signal.

The testing device 500 also comprises a series of flip-flops 511, 513, 515. The flip-flops 511, 513, 515 have three terminals—an input terminal, an output terminal, and a reset terminal. The input terminal of flip-flop 511 is connected to input buffer 501 and input buffer 503, the reset terminal of flip-flop 511 is connected to input buffer 502, and the output terminal of flip-flop 511 is connected to the output buffer 505. The flip-flop 513 is similarly connected to input buffers 501, 502, 503, and to the output buffer 507. The flip-flop 515 is also similarly connected to input buffers 501, 502, 503, and to the output buffer 507.

The flip-flop 511, the flip-flop 513, and flip-flop 515 are also interconnected by having their reset terminals coupled together.

The testing device 500 receives three input control signals, SCLCK, SRESET, SDATA, which are transmitted to each of the flip-flops 511, 513, 515.

The first flip-flop 511 receives the three input control signals, SCLK, SRESET, and SDATA and outputs a first output signal to first output buffer 505. The output buffer 505 then forwards this first output signal to first output pin OUT(1).

The second flip-flop 513 also receives the three input control signals, SCLK, SRESET, and SDATA and outputs a second output signal to second output buffer 507. The output buffer 507 then outputs this second output signal to second output pin OUT(2).

The third flip-flop 515 also receives three input control signals, SCLK, SRESET, and SDATA and outputs a third output signal to third output buffer 507. The output buffer 507 then outputs this third output signal to third output pin OUT(2).

In testing device 500, each flip-flop 511, 513, 515 forms a shift register and the output from each flip-flop represents a clocked data shifting through a single inter-device FPGA link. Each flip-flop corresponds to each inter-device FPGA link to be tested.

In order to have a successful result, all the output signals at output pins OUT(1), OUT(2), OUT(3) must compare exactly to the input control signal SDATA. If any of the output signals OUT(1), OUT(2), OUT(3) does not match, a fault has been detected.

As described before, each flip-flop is connected to an input buffer and to an output pin. Thus, when an output is transmitted, a user is given capabilities to watch the pattern of the output pattern signal and compare it to the input pattern signal transmitted as SDATA. In this manner, the faults are detected in real-time. The output data pattern signal may be observed by coupling an external circuit or probe to the output terminals.

Since output monitoring capabilities exist at each output pin OUT(1), OUT(2), OUT(3), the exact location of the fault can be detected accurately. The probe or external circuit used to observe the output data pattern immediately points to the source of the problem. For example, OUT(1) shows the output pattern from first inter-device FPGA link which is compared to the input SDATA pattern to see whether both patterns match. If there is a match, the first inter-device FPGA link is working, a mismatch indicates a fault in the first FPGA link. Similarly, the second inter-device FPGA link is tested at the second output terminal OUT(2), and the third inter-device FPGA link is tested at the third output terminal OUT(3).

The testing device 500 is flexible and provides a user with the ability to choose the number of inter-device connections to be tested within a single FPGA. One may simply add more flip-flops and use the principles of the current invention to test many more FPGA links. Specifically, each path between a flip flop and the next flip flop can be an inter-device FPGA link.

The testing device 500 also provides a user with flexibility to choose the input data pattern and manually shift a data pattern. This is accomplished by having separate SRESET and SDATA input signals. At any point in the process, a user may reset the process using the SRESET and choose a new data pattern to be pushed in the register. A user may also determine the number of inter-device links to be tested.

As an example, the testing device 500 may be used to send a "1" through each of the connected output pins which were initialized to "0" after reset. This allows a user to clock the "1" through the series of flip-flops 511, 513, 515 and observe the output at the output pins of the register 500 as well as at the exposed nodes on the top/bottom surface of the tester or prototype board.

The testing device 500 also can be used to test a particular FPGA on a tester/prototype board with multiple FPGAs. When a particular FPGA is being tested, the other FPGAs on the board are tristated, or set in an ideal phase. Furthermore, the testing device 500 can be configured on a tester board without even plugging the board into a system. One can download the test program of the testing device 500 through EPROM devices by using traditional power supply and removable jumpers for SRESET and SDATA inputs.

Thus, the testing circuit 100, 300, 500 address the need for a test circuit that would provide some level of confidence in the operational integrity of complex emulation boards that are commonly used to develop circuits. One such typical board is a trigger board. Such a board commonly utilize multiple FPGAs to build logic arrays on various chips and provide arbitrated interfaces to the memory devices. Therefore, it is important to test the inter-device links among multiple FPGAs. The present invention provides a solution to the problem of testing these inter-device FPGA links.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

I claim:

1. A test device for testing inter-device FPGA links among a plurality of FPGAs, said test device comprising:
    a control circuit for generating an input pattern signal, said control circuit comprising;
        a counter for generating a count signal;
        a pattern generator coupled to receive said count signal and generate a different data pattern responsive to each of a plurality of different count signals; and
        a comparator coupled to receive said output pattern signal from said output terminal of said shift register and for comparing said input pattern signal and said output pattern signal;
        a descrambler connected to said comparator, said descrambler capable of descrambling said output pattern signal to generate a value corresponding to a count signal and wherein said comparator compares said count signal from said counter to said value generated by said descrambler
    a shift register coupled to receive said input pattern signal from said control circuit, said shift register having an output for outputting an output pattern signal, said shift register configured from elements of said plurality of FPGAs, and said shift register forming a shift block through said inter-device FPGA links.

2. The test device of claim 1 wherein said comparator further comprises a terminal for outputting the comparison results from said comparator.

3. The test device of claim 1 further comprising a recorder for recording the comparison results from said comparator.

4. The test device of claim 1 wherein said shift register is unidirectional.

5. A test device for testing inter-device FPGA links among a plurality of FPGAs, said test device comprising:
    a control circuit for generating an input pattern signal; and
    a shift register coupled to receive said input pattern signal from said control circuit, said shift register having an output for outputting an output pattern signal, said shift register configured from elements of said plurality of FPGAs and forming a shift block through said inter-device FPGA links, said shift register comprising;
        a first flip-flop having an input and output;
        an output buffer having an input and an output, said output buffer connected to said output of said first flip-flop;
        an input buffer having an input and an output, wherein said output of said output buffer and said input buffer are connected by an inter-device FPGA link; and
        a second flip-flop connected to said output of said input buffer.

6. The test device of claim 5 wherein said first flip-flop is coupled to receive said input pattern signal from said control circuit.

7. The test device of claim 5 wherein said output buffer is coupled to receive said input signal from said flip-flop and transmit it to said inter-device FPGA link, and said input buffer is coupled to receive said input signal from said FPGA link and transmit it to said second flip-flop.

8. The test device of claim 5 wherein said shift register comprises a plurality of additional flip-flops between said first and second flip-flops, each having a corresponding input buffer and output buffer, said test device for testing a plurality of inter-device FPGA links.

9. The test device of claim 5 wherein said shift register further comprises a probe for observing said output pattern signal in real-time.

10. The test device of claim 9, wherein said control circuit further indicates a location of any fault by comparing said output pattern signal and said input pattern signal.

11. A test device for testing inter-device FPGA links among a plurality of FPGAs, said test device comprising:
    a control circuit for generating an input pattern signal; and
    a bidirectional shift register coupled to receive said input pattern signal from said control circuit, said shift register having an output for outputting an output pattern signal, said shift register configured from elements of said plurality of FPGAs and forming a shift block through said inter-device FPGA links, said shift register comprising;
        a first multiplexer having an input and an output;
        a flip-flop having an input and an output, said input of said flip-flop connected to said output of said first multiplexer;
        a second multiplexer having an input and an output, said output of said second multiplexer connected to said input of said first multiplexer, said input of said second multiplexer connected to said output of said flip-flop;
        a first bi-directional buffer having an input and an output, said input of said bi-directional buffer connected to said output of said second multiplexer; and
        a second bi-directional buffer having an input and an output wherein said output of said first bi-directional buffer is connected to said input of said second bi-directional buffer by an FPGA link.

12. The test device of claim 11 wherein said input of said first multiplexer and said output of said second multiplexer are connected to said control circuit.

13. The test device of claim 11 wherein said first multiplexer is coupled to receive said data pattern from said control circuit.

14. The test device of claim 11 wherein said output of second multiplexer is coupled to transmit said output pattern signal to said control circuit.

15. The test device of claim 11 wherein said first bi-directional buffer and said second bi-directional buffer are capable of being used alternately as input buffers and output buffers.

16. The test device of claim 11 wherein said shift register further comprises a probe for observing said output pattern signal in real-time.

17. The test device of claim 16, wherein said external circuit is capable of indicating a location of any faults by comparing said input pattern signal and said output pattern signal.

18. A test device for testing inter-device FPGA links among a plurality of FPGAs, said device comprising:
a counter for generating count signals;
a pattern generator for receiving said count signal and generating a different input data signal responsive to each of a plurality of different count signals;
a shift register coupled to receive said input pattern signal from said pattern generator, said shift register having an output for outputting an output pattern signal, said shift register configured from elements of said plurality of FPGAS, and said shift register forming a shift block through said inter-device FPGA links; and
a comparator coupled to receive said output pattern signal from said output terminal of said shift register and for comparing said input pattern signal and said output pattern signal
a descrambler connected to said comparator, said descrambler capable of descrambling said output pattern signal to generate a value corresponding to a count signal and wherein said comparator compares said count signal from said counter to said value generated by said descrambler.

19. The test device of claim 18 wherein said shift register is unidirectional.

20. The test device of claim 18 further comprising a circuit for outputting the comparison results from said comparator.

21. The test device of claim 18 further comprising a recorder for recording the comparison results from said comparator.

22. The test device of claim 18 further comprising an external circuit for observing said output pattern signal in real-time.

23. The test device of claim 2, wherein said external circuit is capable of indicating source of any faults.

24. A test device for testing inter-device FPGA links among a plurality of FPGAs, said device comprising:
a counter for generating count signals;
a pattern generator for receiving said count signal and generating a different input data signal responsive to each of a plurality of different count signals;
a shift register coupled to receive said input pattern signal from said pattern generator, said shift register having an output for outputting an output pattern signal, said shift register configured from elements of said plurality of FPGAs, and said shift register forming a shift block through said inter-device FPGA links; and
a comparator coupled to receive said output pattern signal from said output terminal of said shift register and for comparing said input pattern signal and said output pattern signal;
wherein said shift register comprises;
a first flip-flop having an input and output;
an output buffer having an input and an output, said input connected to said output of said first flip-flop;
an input buffer having an input and an output, wherein said output of said output buffer and said input buffer are connected by an inter-device FPGA link; and
a second flip-flop connected to said output of said input buffer.

25. The test device of claim 24 wherein said first flip-flop is coupled to receive said input pattern signal from said control circuit.

26. The test device of claim 24 wherein said output buffer is coupled to receive said input pattern signal from said flip-flop and transmitting to said inter-device FPGA link.

27. The test device of claim 24 wherein said input buffer is coupled to receive said input pattern signal from said FPGA link and transmitting to said second flip-flop.

28. The test device of claim 24 wherein said second flip-flop is coupled to receive said input pattern signal from said input buffer and outputting said output pattern signal.

29. The test device of claim 24 wherein said shift register further comprises a plurality of flip-flops and a plurality of buffers for testing a plurality of FPGA links.

* * * * *